(12) United States Patent
Herron

(10) Patent No.: US 6,789,855 B2
(45) Date of Patent: Sep. 14, 2004

(54) AUTOMATIC SET AND RELEASE HAND BRAKE

(75) Inventor: Robert A. Herron, Charleston, IL (US)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 0 days.

(21) Appl. No.: 10/245,449

(22) Filed: Sep. 17, 2002

(65) Prior Publication Data

US 2004/0050629 A1 Mar. 18, 2004

(51) Int. Cl.$^7$ ............................................... B60T 17/02
(52) U.S. Cl. ......................... 303/13; 188/33; 188/107; 192/15; 74/504; 74/505; 74/575
(58) Field of Search ................................ 303/1, 18, 13; 188/145, 382, 82.84, 33, 107, 153 R; 192/223.2, 225, 15, 16; 74/504, 491, 507, 552, 575, 577 R, 577 S, 577 M

(56) References Cited

U.S. PATENT DOCUMENTS

| | | | | |
|---|---|---|---|---|
| 3,988,944 A | * | 11/1976 | Klasing | 74/505 |
| 4,236,424 A | * | 12/1980 | Kanjo et al. | 74/505 |
| 4,282,771 A | * | 8/1981 | Grube | 74/505 |
| 4,368,648 A | * | 1/1983 | Housman et al. | 74/505 |
| 6,179,093 B1 | * | 1/2001 | Daugherty, Jr. | 188/33 |
| 6,364,428 B1 | * | 4/2002 | Labriola et al. | 303/13 |
| 6,394,559 B1 | * | 5/2002 | Ring et al. | 303/13 |

FOREIGN PATENT DOCUMENTS

JP        2002-127901 A   *  5/2002

* cited by examiner

Primary Examiner—Matthew C. Graham
Assistant Examiner—Mariano Sy
(74) Attorney, Agent, or Firm—James Ray & Associates

(57) ABSTRACT

An automatic application hand brake apparatus is provided for automatically applying at least one brake member secured to a railway vehicle with the hand brake assembly. The apparatus comprises an operating member having at least one ratchet attached to a drive shaft of said hand brake assembly. An application cylinder is connected to a drive arm pivotally attached to the drive shaft and containing and operating pawl engaging the operating ratchet. The reciprocating motion of the drive arm caused by the application cylinder enables reciprocal rotation of the operating arm and furthermore causing application of at least one brake member. A plurality of control valves are connected to the source of the fluid pressure for initiating and regulating the supply of fluid pressure to the application cylinder and for stopping an automatic application of such hand brake in case of the emergency or a reversal of the unintended activation.

10 Claims, 10 Drawing Sheets

AUTOMATIC SET AND RELEASE HAND BRAKE

CROSS-REFERENCES TO RELATED APPLICATIONS

This application is related to U.S. patent application Ser. No. 10/217,570 entitled "Automatic Application Hand Brake Winding Mechanism", filed Aug. 13, 2002 and assigned to the assignee of the present application. This application is also related to U.S. patent application Ser. No. 10/201,888 entitled "Automatic Set and Release Hand Brake Pneumatic Circuit Design II/Automatic Application Function", filed Jul. 24, 2002 and also owned by the assignee of the present application. The disclosures of U.S. patent application Ser. Nos. 10/217,570 and 10/201,888 are hereby incorporated herein by reference thereto.

FIELD OF THE INVENTION

The present invention relates, in general, to hand brake assemblies for use on railway type vehicles and, more particularly, this invention relates to an apparatus to automatically activate and apply the brakes on such railway vehicle without requiring an operator to manually wind the chain on such hand brake.

BACKGROUND OF THE INVENTION

Railway car hand brake mechanisms for applying at least one brake member secured to a railway vehicle in an emergency condition are well known in the art. U.S. Pat. Ser. No. 4,368,648 titled "Hand Brake for Railroad Car" teaches such a hand brake having a quick release mechanism. They usually include a large, rotatable hand wheel disposed in a vertical plane and mounted on a drive shaft which, through a gear train, can rotate a chain drum to wind up a chain that is secured at its end remote from the chain drum to the brake member of the railway car. As the hand wheel is rotated in one direction, the brakes are applied and rotation of the hand wheel drive shaft in the opposite direction is prevented by a pawl which engages a detent ratchet on the hand wheel drive shaft.

The brakes may be released by disengaging the pawl from the detent ratchet but this causes rapid rotation of the hand wheel and the gears of the gear train. To avoid rapid rotation of the hand wheel, hand brake mechanisms have been devised which are known as "quick release" mechanisms.

Generally these quick release mechanisms include a releasable connecting means between the hand wheel shaft and the gear train. When the connecting means is released, the gears of the gear train rotate rapidly, without constraint by the pawl and detent wheel, but the hand wheel remains stationary.

It has been generally known in the art that a new brake member of the railway vehicle requires a 13" nominal chain take-up while 18" of chain take-up represents a worst-case scenario of the brake member having worn brake shoes and excessive chain slack. The teachings of the U.S. Pat. Ser. No. 4,368,648 are hereby incorporated in present application by reference thereto.

The Association of American Railroads (AAR) specifies that the standard power hand brake mechanisms shall provide an average load on the chain of 3,350 lbs. with a 125 lb. turning force applied to the rim of a wheel twenty-two inches in diameter in order to set the brake.

Aforementioned application U.S. Ser. No. 10/217,570 teaches an automatic application set and release (ASR) hand brake apparatus, hereinafter referred to as ASR Design II hand brake, for automatically applying said at least one brake member. The apparatus comprises an operating member having at least one ratchet engageable with at least one gear of a gear assembly disposed in a housing member of the hand brake assembly for operating the gear assembly in a direction which will cause an application of the at least one brake member secured to a railway vehicle with the hand brake assembly. The apparatus also includes an application cylinder mounted on the railway vehicle and a drive arm extending from an end of the application cylinder. The drive arm has a first portion which is connected to the operating member. The drive arm is capable of reciprocating with respect to the application cylinder upon the application of a force thereto to supply a predetermined pressure to the operating member at least a sufficient amount so as to cause an application of the at least one brake member. A pressure supply source is connected to the application cylinder for supplying a force to the drive arm thereby causing an automatic application of the at least one brake member by the hand brake assembly.

While the ASR Design II hand brake has proven to be sufficient in achieving a vertical load on the chain of 3,350 lbs., the difficulties were encountered in maintaining said achieved vertical load for a long period of time. Based upon further data collected on the ASR Design II hand brake, it was determined that a load drop occurs over time, as the emergency reservoir pressure is dropping from the initial nominal setting, resulting in the average hold load falling below the requirement of 3,350 lbs.

As it can be seen from the above discussion, it will be advantageous to have an automatic application set and release apparatus for applying the hand brake which is capable of providing and holding the required average load on the chain of 3,350 lbs.

Generally, the brake pipe pressure in a railway vehicle is about 90 psi. In the emergency condition, after the main brakes have been applied, the pressure of the emergency reservoir equalizes at an average initial nominal setting of 78 psi for emergency hand brake application. The average initial nominal setting of 78 psi is, therefore, the maximum available pressure at which the ASR hand brake is required to achieve the required average load of 3,350 lbs. The ASR Design II hand brake with the improved pneumatic circuit as taught by the aforementioned application U.S. Ser. No. 10/201,888 has been set to operate with an average initial nominal pressure of 70 psi, providing operating margins for nominal pressure fluctuations. Said pneumatic circuit comprises control means connected to the source of fluid pressure for supplying and regulating said fluid pressure to the application cylinder and for stopping an automatic application of such brake means in case of the emergency or a reversal of the unintended activation.

Since recharging of the brake pipe pressure in the railway vehicle after a brake application requires a predetermined time period based on the pressure differential to be restored and, since, a typical train may consist of 150 railway vehicles, those of the ordinary skill in the art can easily see that it will be advantageous to employ ASR hand brake capable of achieving the required hold load with reduced emergency reservoir pressure in order to reduce the overall recharging period and, more particularly, to reduce the dwell time of the entire train consist due to recharging. It is further advantageous to improve the efficiency of the ASR hand brake and, more particularly, reduce the pressure drop within the operating means disposed within said apparatus as well as to reduce the size of the application cylinder.

SUMMARY OF THE INVENTION

An automatic application hand brake apparatus is provided for automatically applying at least one brake member secured to a railway vehicle with the hand brake assembly. The apparatus comprises a mounting bracket, an operating member having at least one ratchet attached to a drive shaft of said hand brake assembly externally of the hand brake assembly housing. The apparatus also includes an application cylinder connected to a drive arm pivotally attached to said drive shaft and containing and operating pawl engaging said operating ratchet. Said operating ratchet is rotating as a single unit with said drive shaft and a detent ratchet disposed within said hand brake assembly, thereby preventing partial unwindings of a chain winding gear of the hand brake assembly. A spring means are attached to said drive arm to urge said operating pawl toward said operating ratchet. A first and a second brass spacers are provided to substantially reduce friction during the rotation of said drive arm. The application cylinder is pivotally mounted on the mounting bracket enabling reduction of the application cylinder stroke. The reciprocating motion of the drive arm caused by the application cylinder enables reciprocal rotation of the operating arm and furthermore causing application of at least one brake member. A control means is connected to the source of the fluid pressure for initiating and regulating the supply of fluid pressure to the application cylinder. An additional control means is connected to the source of the fluid pressure for stopping an automatic application of such brake means in case of the emergency or a reversal of the unintended activation.

OBJECTS OF THE INVENTION

It is, therefore, one of the primary objects of the present invention to provide an apparatus engageble with a hand brake assembly which automatically activates and applies the brakes on a railway vehicle.

Another object of the present invention is to provide an apparatus engageable with a hand brake assembly on a railway vehicle which achieves and holds the required load for a standard power hand brakes.

A further object of the present invention is to provide an apparatus engageable with a hand brake assembly on a railway vehicle which provides a more efficient operation.

An even further object of the present invention is to provide an apparatus engageable with a hand brake assembly on a railway vehicle which utilizes smaller space envelope.

An additional object of the present invention is to provide an apparatus engageable with a hand brake assembly on a railway vehicle which provides an emergency shut-off means to stop automatic application of the hand brake.

In addition to the several objects and advantages of the present invention generally described above, various other objects and advantages of the invention will become much more readily apparent to those persons who are skilled in the relevant art from the following more detailed description, particularly, when such detailed description is taken in conjunction with the attached drawing figures and the claims appended hereto.

DETAILED DESCRIPTION OF THE INVENTION

Figure 1:
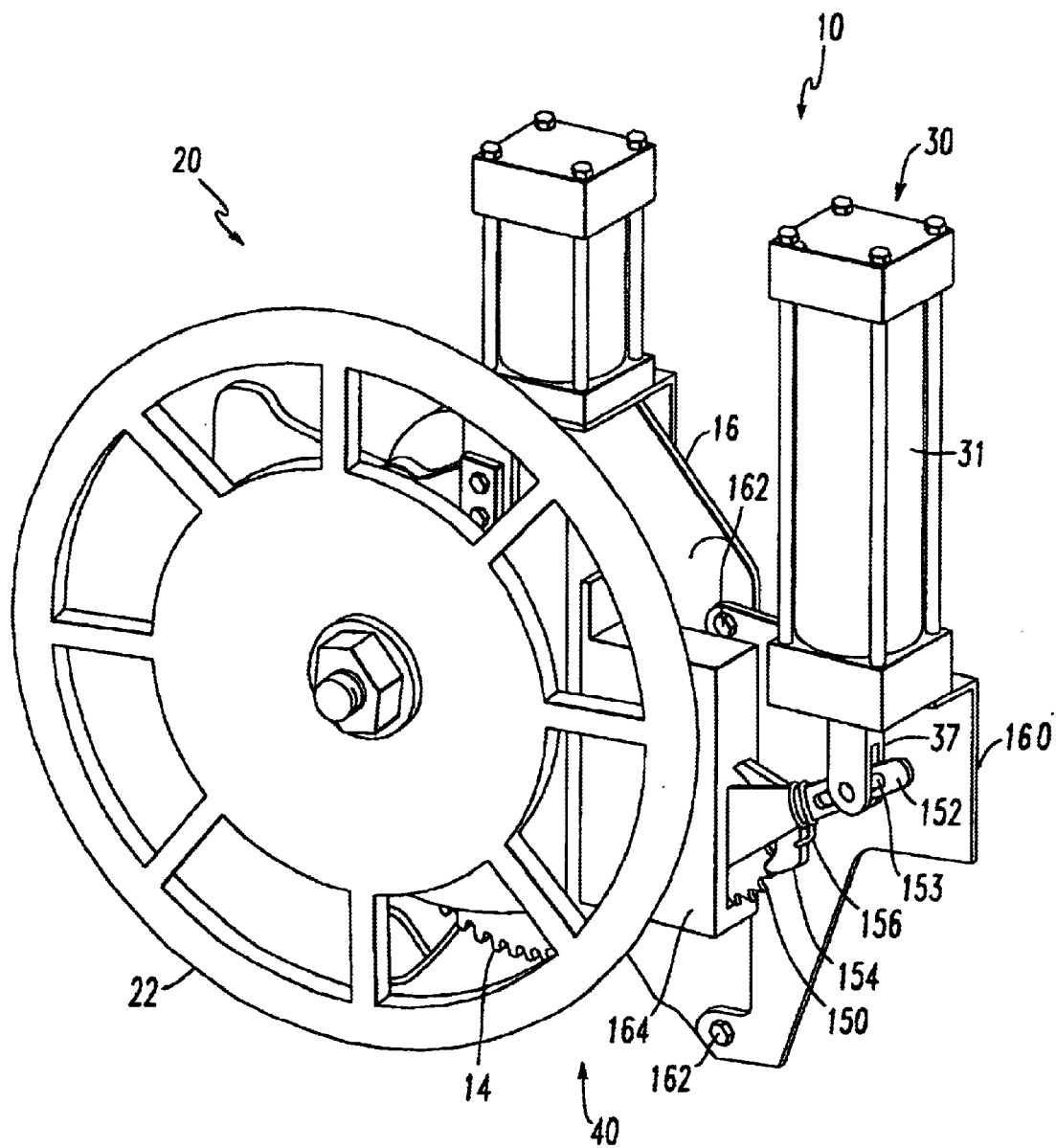
FIG. 1 is a perspective view of the ASR Design II hand brake.

The following background information is provided to assist the reader to understand the environment in which the invention will typically be used. The terms used herein are not intended to be limited to any particular narrow interpretation unless specifically stated otherwise in this document.

Prior to proceeding to the more detailed description of the various embodiments of the present invention, for the sake of clarity and understanding of such invention, it should be noted that identical components having identical functions have been identified with identical reference numerals throughout each of the figures illustrated herein.

In reference to FIG. 1, the ASR Design II apparatus, generally designated 10 engages a hand brake assembly, generally designated 20 for automatically applying at least one brake means (not shown) secured to a railway vehicle (not shown) with such hand brake assembly 20.

Such apparatus 10 includes an operating means, generally designated 30, having least a portion thereof, i.e., ratchet 150, engageable with at least one chain winding gear 14 of a hand brake gear assembly, generally designated 40, disposed in a housing member 16 of such hand brake assembly 20 for operating such gear assembly 40 in a direction which will cause an application of such at least one brake means. Said operating means 30 further comprise a double acting pneumatic cylinder 31 having a rod 37 engageable with a drive arm 152. At least one operating pawl 154 is pinned to the said drive arm 152 and a spring means 156 is provided for urging the operating pawl 154 into contact with a ratchet 150. Said double acting pneumatic cylinder 31 is mounted to a bracket 160 having attachments 162 to said housing 16. A cover 164 is provided to substantially shield the engagement between said ratchet 150 with said chain winding gear 14 from the inadvertent access by railway vehicle personnel.

Figure 9:
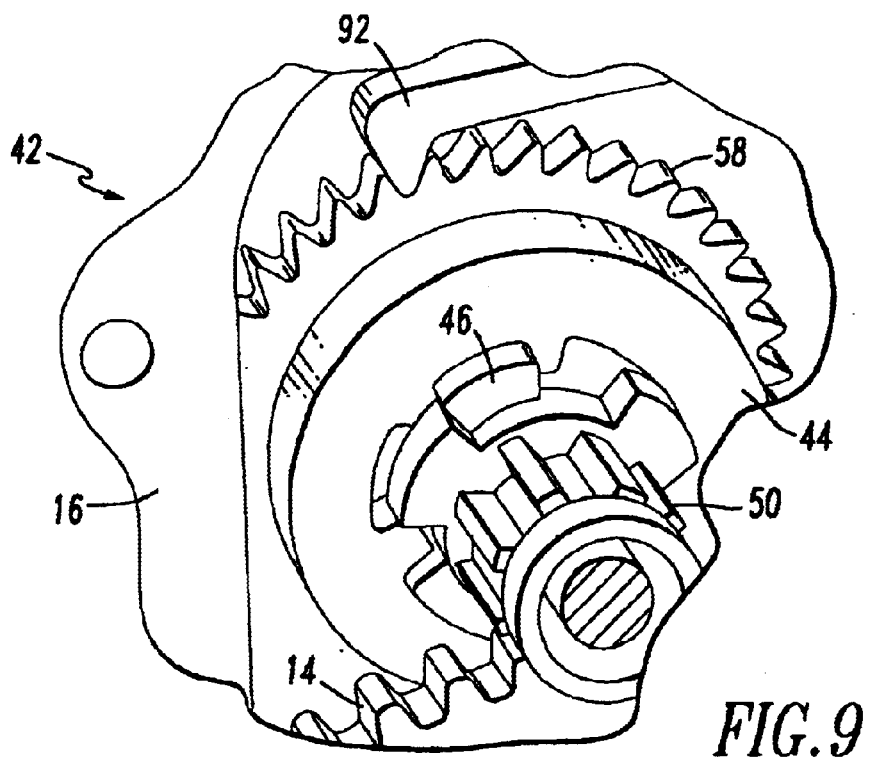
FIG. 9 is a partial perspective view of the hand brake of the Design III, particularly showing the orientation of the movable cam disposed within the clutch mechanism.

Application of a force within the operating cylinder 31 causes the rod 37 to move outwardly from the cylinder 31 and apply a downward force to the drive arm 152 which causes the operating pawl 154 to engage a tooth within the ratchet 150. Rotation of the ratchet 150 in the clockwise direction, as shown in FIG. 1, causes the chain winding gear 14 of the hand brake gear assembly 40 to rotate in a counter clock-wise direction which will cause winding of the chain (not shown) and an application of the brake means (not shown). At least one return spring 34, best shown in FIG. 9, is provided within the operating cylinder 31 to urge the rod 37 back to its original position. Furthermore, a cavity 153 is disposed within drive arm 152 for accommodating said engagement with rod 37 during the motion. Repeated applications of pressure within the operating cylinder 31 enables the chain winding gear 14 of the hand brake gear assembly 20 to rotate a sufficient amount to result in an application of the brakes.

Figure 2:
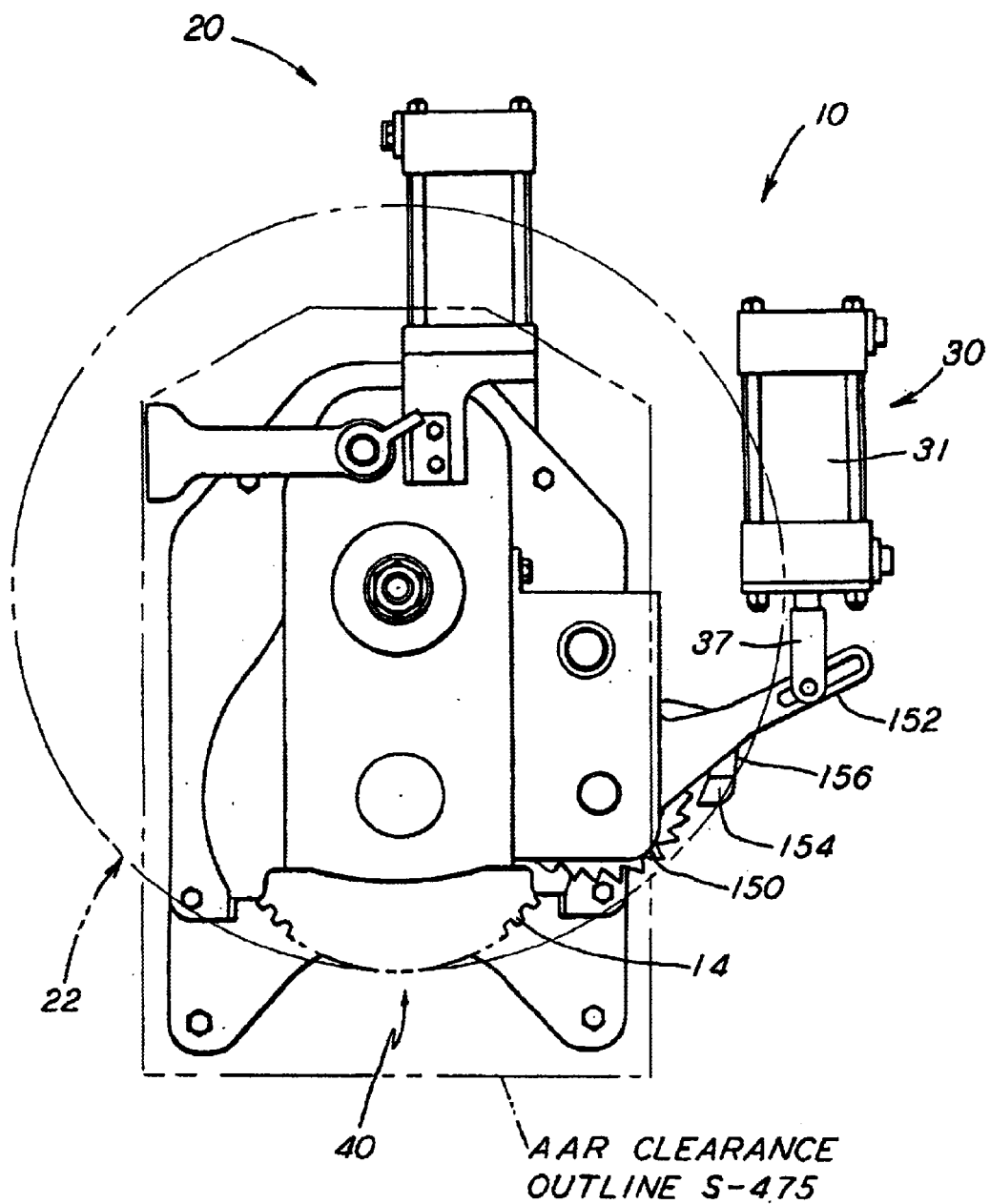
FIG. 2 is a front elevation view of the ASR Design II hand brake, particularly showing the spatial configuration of the ASR Design II hand brake according to the established AAR clearance outline.

In further reference to FIG. 2, there shown a spatial configuration of the ASR Design II hand brake as related to the AAR clearance outline S-475. As it can be seen in FIG. 2, the ASR Design II hand brake exceeds the height of said outline by approximately 6 inches but, more importantly, it the exceeds the width of said outline by 6 inches.

Figure 3:
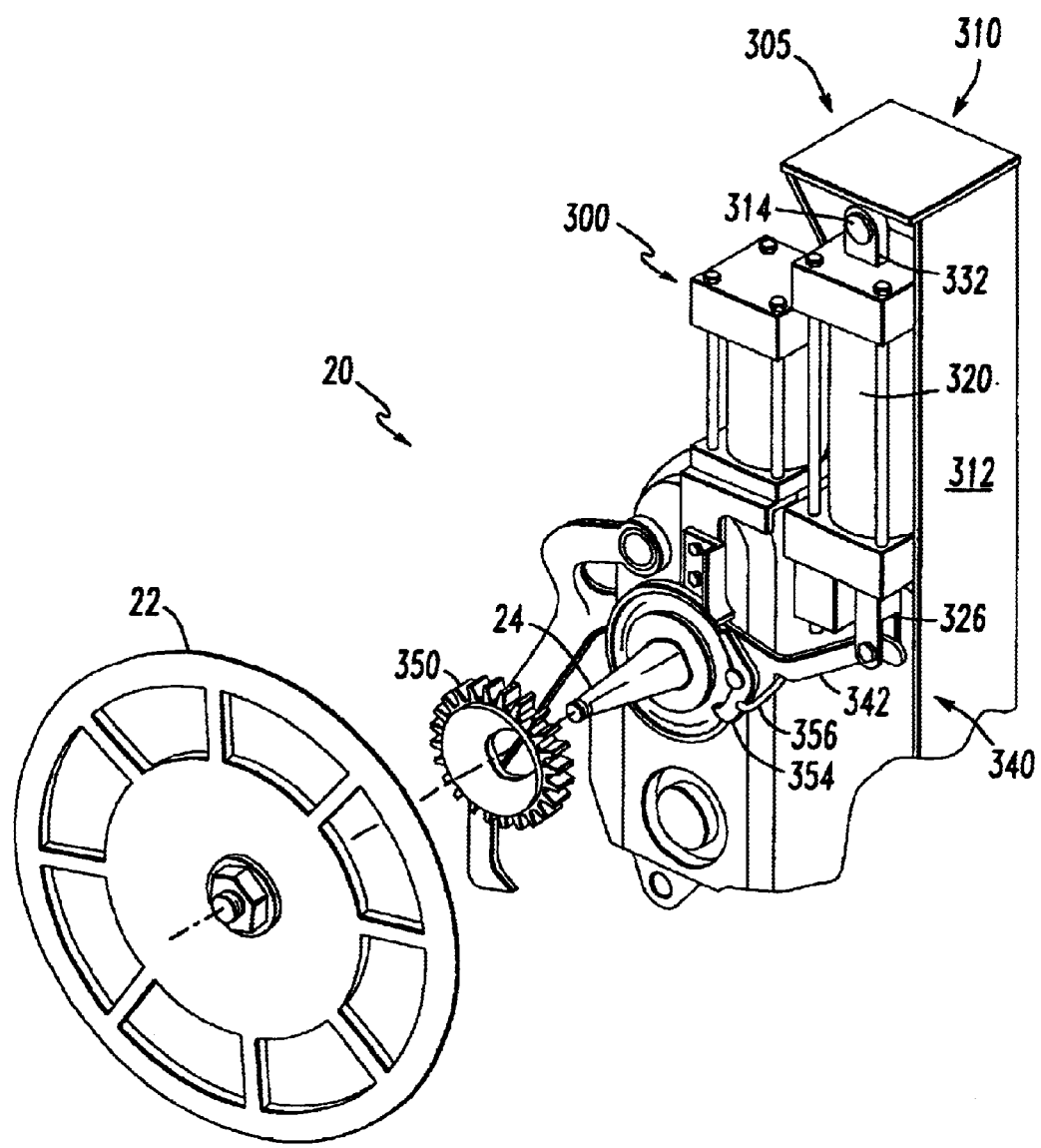
FIG. 3 is a perspective view of the ASR Design III hand brake of the present invention, showing the hand wheel and ratchet of the present invention removed from the drive shaft for clarity.
Figure 4:
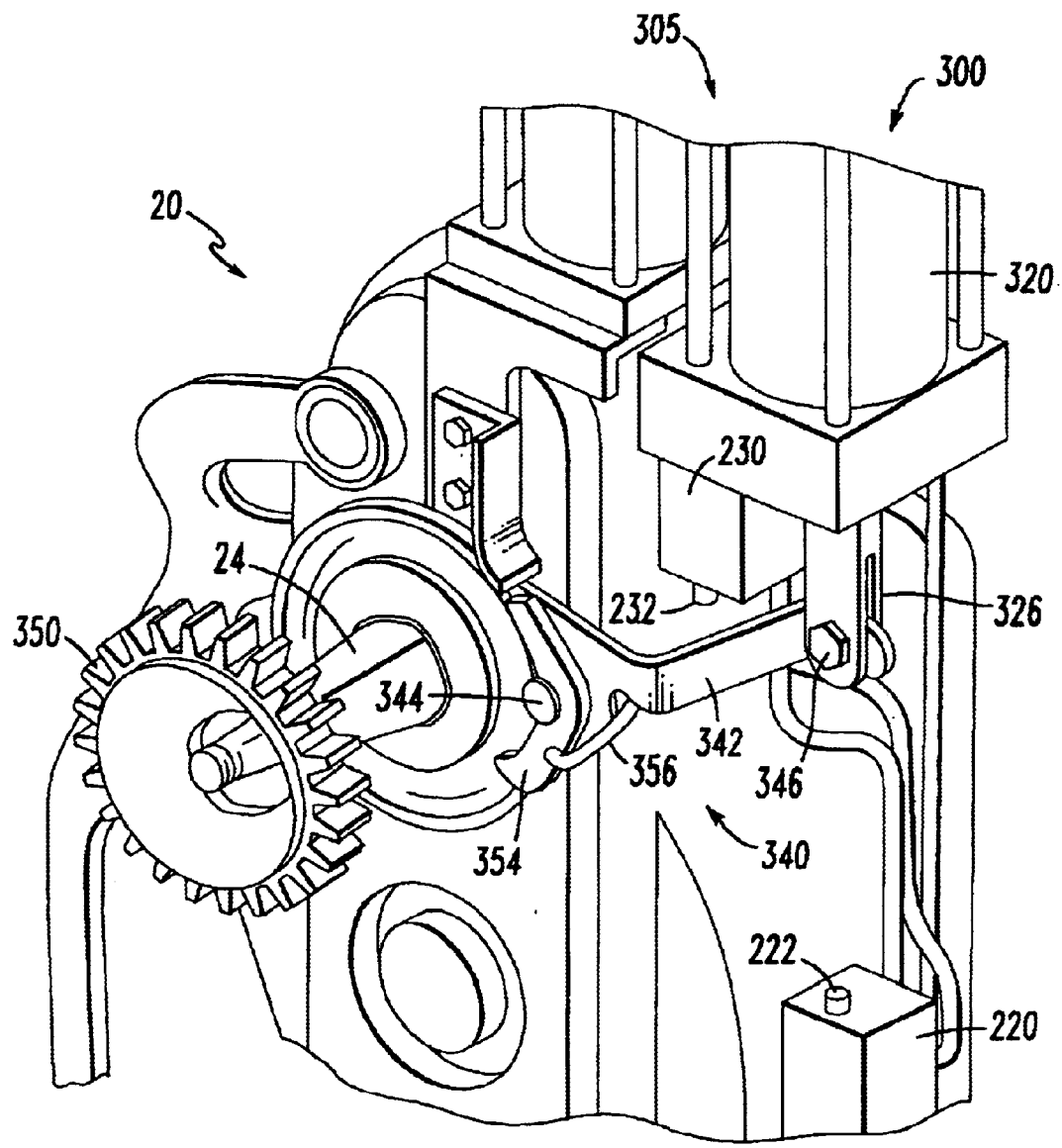
FIG. 4 is a partial perspective view of the ASR Design III hand brake of the present invention, particularly showing the operating means with the ratchet separated for clarity.

The ASR hand brake of the present invention, hereinafter referred to as Design III, is best illustrated in FIGS. 3 through 7. An ASR apparatus, generally designated 300, comprises an operating means, generally designated 305, having least a portion thereof, i.e., operating ratchet 350, substantially engageable with a drive shaft member 24, disposed in the housing member 16 of such hand brake assembly 20 for operating such hand brake assembly 20 in a direction which will cause an application of such at least one brake means. Said operating means 305 further comprise mounting bracket, generally designated 310 having a body portion 312, a cylinder pivot 314 and at least one attachment means 316 for attachment to said housing 16. Preferably, a single acting pneumatic cylinder, generally designated 320 is pivotally mounted to said mounting bracket 310 at the cylinder pivot 314. Said single acting pneumatic cylinder 320 further having a rod 326 engageable with a drive arm, generally designated 340, having a body portion 342, a first pivot 344, and a second pivot 346. As best shown in FIG. 4, said drive arm 340 is pivotally collared about said drive shaft 24. At least one operating pawl 354 is pivotally attached to the said drive arm 340 at the first pivot 344 for engaging a tooth within said operating ratchet 350 upon the application of said force to said lever and to cause rotation of said operating ratchet 350. A spring means 356 secured to said drive arm 340 is provided for urging the operating pawl 354 into contact with at least one tooth disposed within said operating ratchet 350.

Figure 7:
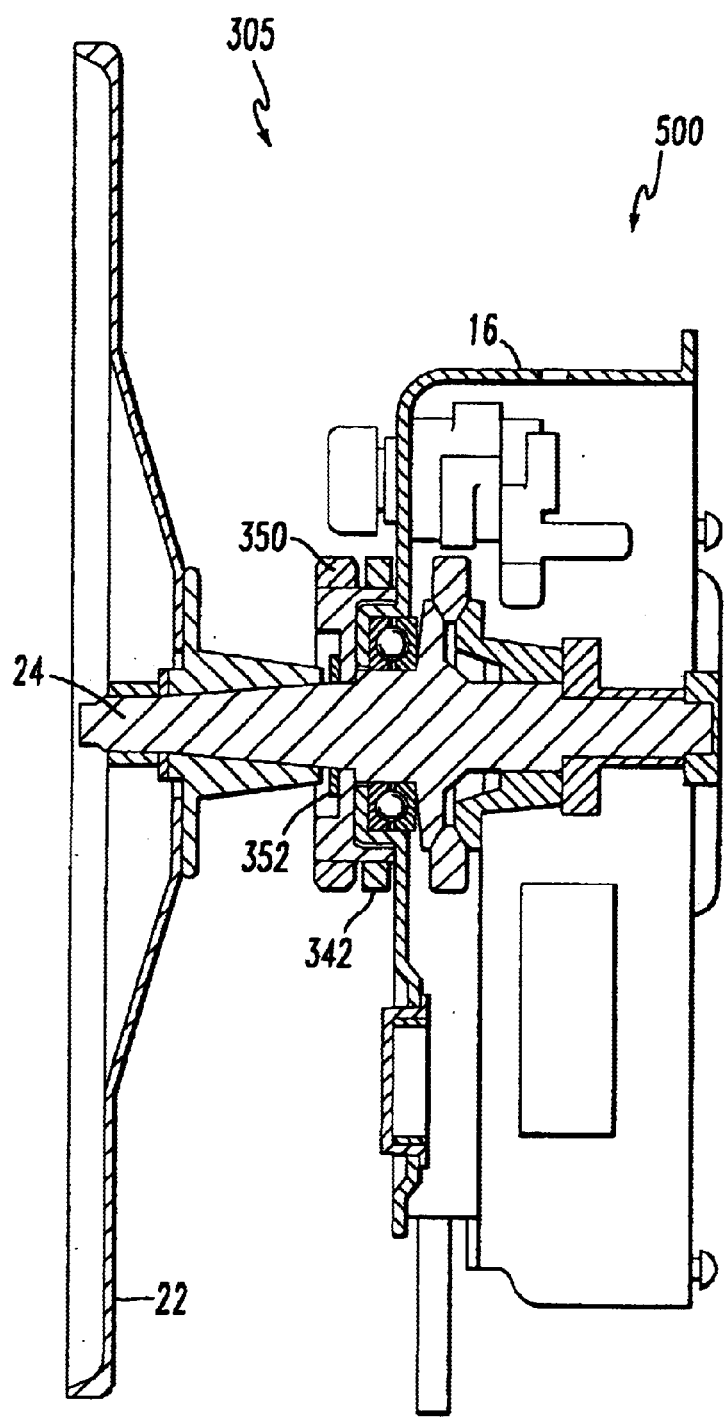
FIG. 7 is a cross-sectional side elevation view of the ASR Design III hand brake of the present invention, taken along line 7—7 in FIG. 5.

A friction reducing means disposed adjacent said operating ratchet 350 and said drive arm 340 are provided to substantially reduce friction upon rotation of said drive arm 340. In the preferred embodiment said friction reducing means comprise a first brass spacer 358 (not shown) having a flange 359 (not shown) mounted between said operating ratchet 350 and said drive arm 340, said flange 359 (not shown) is disposed between said body portion 342 and said drive shaft 24 for substantially reducing the friction between said drive arm 340 and said drive shaft 24 during the rotation thereof. Said friction reducing means further comprise a second brass spacer 360 (not shown) mounted to between said drive arm 340 and said housing 16. Said first and second brass spacers 358 and 360 respectively are for substantially reducing friction during the rotation of said drive arm 340. Alternatively said first spacer 358 and said second spacer 360 can be manufactured from a plastic material having friction reducing properties. At least one well known wave spring 352, best shown in FIG. 7, is mounted between said ratchet 340 and a hand wheel 22 attached to said drive shaft 24 for preventing movement of said operating ratchet 350 and said drive arm 340 along the axis of said drive shaft 24. The quantity of said at least one wave spring 352 depends on the clearance between said ratchet 340 and said hand wheel 22. A cover 362 (not shown), attachable to said mounting bracket 310, is provided to substantially shield said operating means 305.

Figure 5:
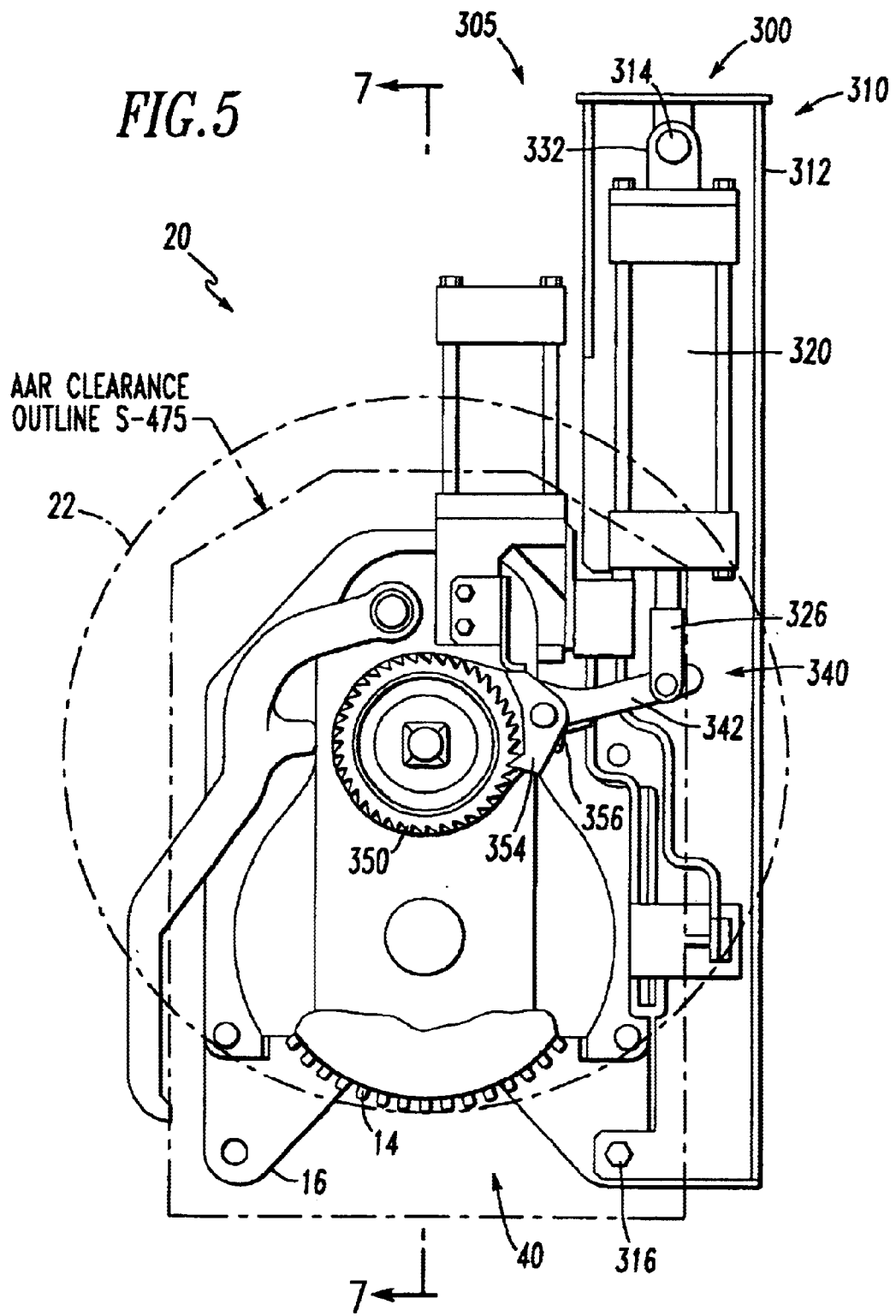
FIG. 5 is a front elevation view of the ASR Design III hand brake of the present invention, particularly showing the spatial configuration of the ASR Design III hand brake according to established AAR clearance outline.
Figure 6:
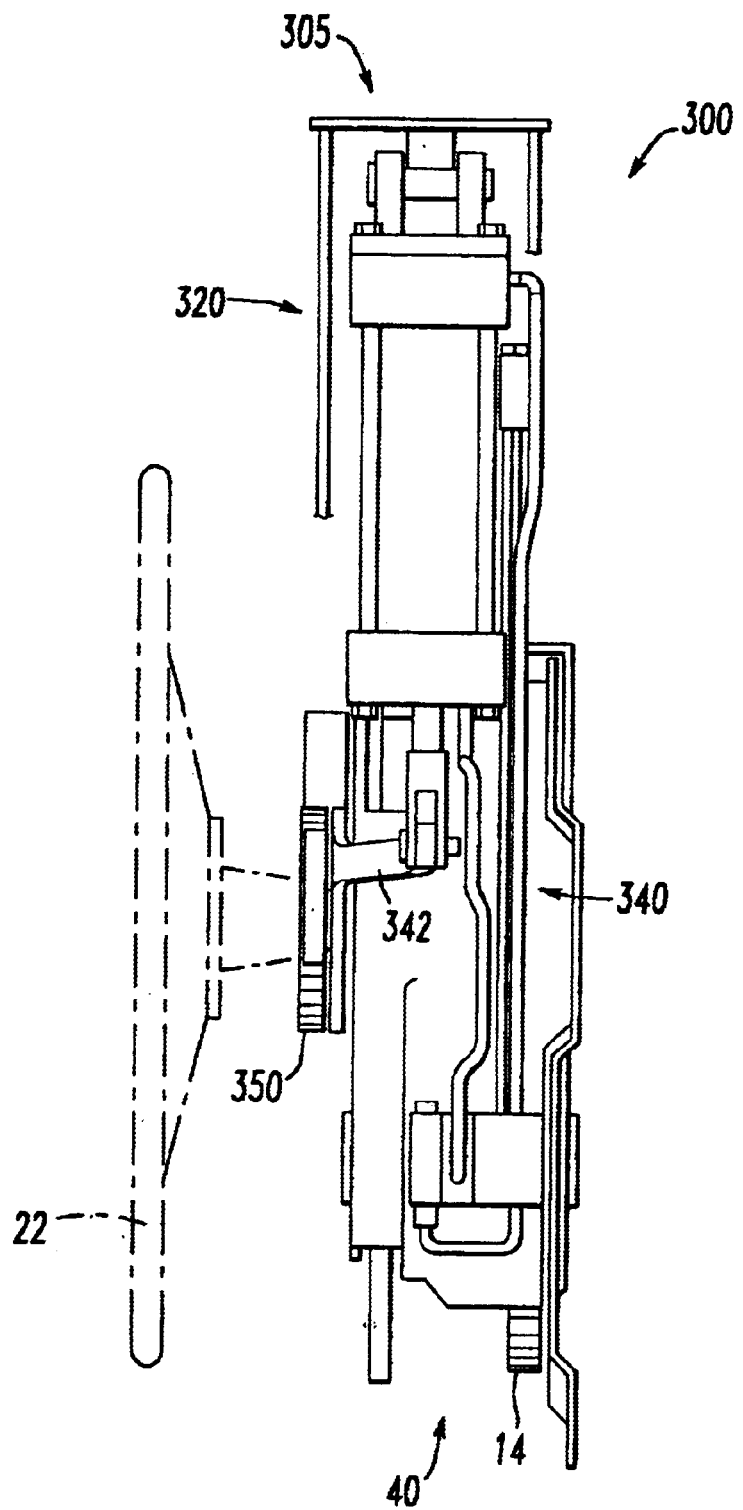
FIG. 6 is a side elevation view of the ASR Design III hand brake of the present invention, shown in FIG. 5
Figure 10:
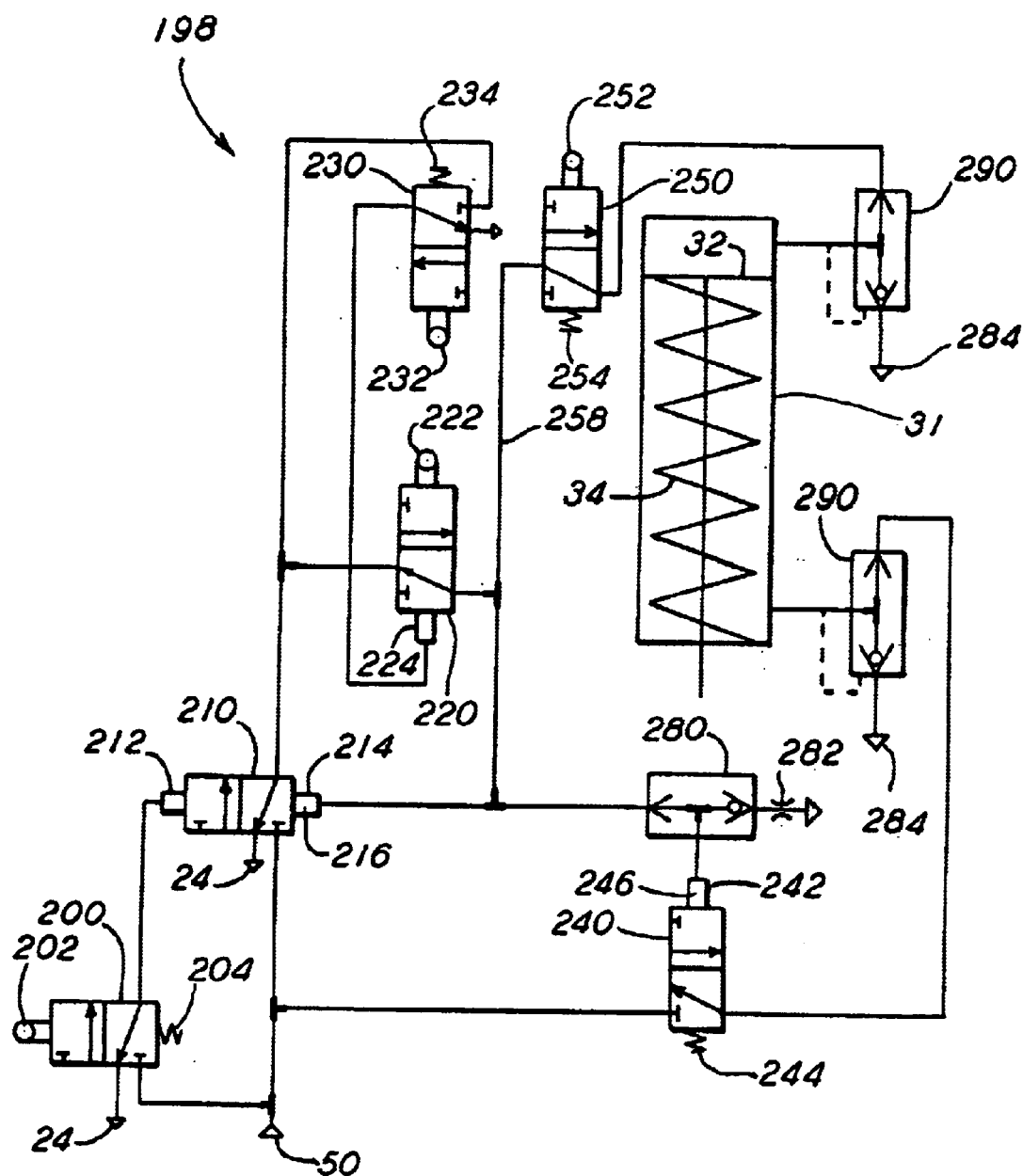
FIG. 10 is a schematic illustration of the ASR Design II control circuit.

Application of a force within the single acting cylinder 320 causes the rod 326 to move outwardly from said cylinder 320 and apply a downward force to the drive arm 340 which causes the operating pawl 354 to engage a tooth within the operating ratchet 350. Rotation of the operating ratchet 350 in the clockwise direction, as shown in FIGS. 3, 4, and 5, causes the pinion 50, best shown in FIGS. 8 and 9, to rotate in the clockwise direction and further causes the chain winding gear 14 of the hand brake gear assembly 40 to rotate in a counter clock-wise direction which will cause winding of the chain (not shown) and an application of the brake means (not shown). At least one return spring 328, best shown in FIG. 10, is provided within the operating cylinder 320 to urge the rod 326 back to its original position. Repeated applications of pressure within said cylinder 320 enables the chain winding gear 14 of the hand brake gear assembly 20 to rotate a sufficient amount to result in an application of the brakes.

Those of the ordinary skill in the art can easily see that pivotal attachment of said single acting cylinder 320 to said mounting bracket 310 at the cylinder pivot 314 enabled elimination of the cavity 153 disposed in such drive arm 152 of the ASR Design II hand brake allowing to reduce said cylinder 320 stroke by up to 1" and, more particularly, enabling to partially reduce the operating pressure.

In the preferred embodiment, said operating ratchet 350 is mounted externally said hand brake housing 16. Alternatively, the function of said operating ratchet 350 can be combined with the function of a detent ratchet 58 disposed within said hand brake apparatus 20 and best shown in FIGS. 8 and 9, by making modifications to said housing 16 to enable engagement between said detent ratchet 58 and said drive arm 340. Yet alternatively, it may be feasible to eliminate the detent ratchet 58 in its entirety by mounting detent means 92 externally of housing 16.

In further reference to FIG. 5, it can be seen that the ASR Design III hand brake improves upon the ASR Design II hand brake in that it reduces the protrusion beyond the horizontal AAR clearance outline to approximately 2.5" as compared with 6" applicable for the ASR Design II hand brake.

Figure 8:
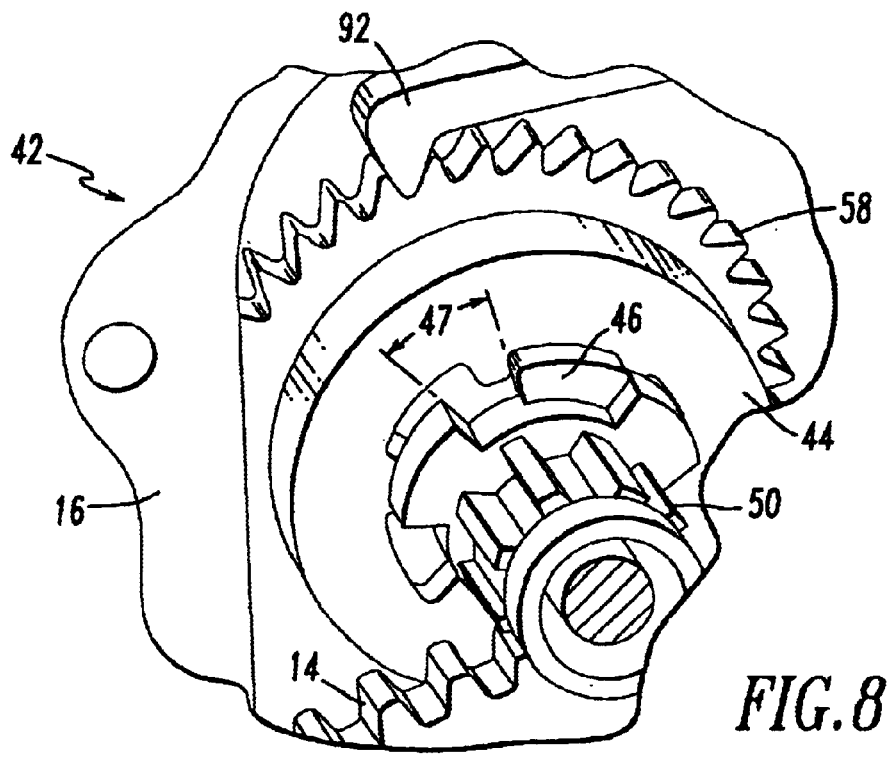
FIG. 8 is a partial perspective view of the hand brake of the Design II, particularly showing the orientation of the movable cam disposed within the clutch mechanism.

The main reason for the improved ASR Design III hand brake can be illustrated in FIGS. 8 and 9 showing partial clutch mechanism, generally designated 42, disposed within said hand brake apparatus 20. Said clutch mechanism 42 comprises a pinion 50 disposed at one end of the drive shaft 24 engaging chain winding gear 14 during the chain winding process. A movable cam 44 having a log portion 46 engages said drive shaft 24 and is allowed to move axially toward the detent ratchet 58. A detent pawl 92 is disposed within said hand brake mechanism 20 for engaging said detent ratchet 58 during chain (not shown) winding process to prevent said chain (not shown) from unwinding.

In operation, in order to automatically apply the brakes, said chain winding gear 14 is rotated counter-clockwise, as viewed in FIGS. 8 and 9, thereby causing the take-up of chain slack. Until such time that tension starts to build up in chain, drive shaft 24, pinion 30, and movable cam 44, all rotate as a unit during rotation of the chain winding gear 14. When chain tension begins to build, such tension is reflected in chain winding gear 14 and transmitted back through pinion 50 to clamp detent ratchet 58 between friction surfaces 56 and 57 (not shown). With the detent ratchet 58 so clamped, continued rotation of the chain winding gear 14 causes drive shaft 24 and the detent ratchet 58 to rotate as a single unit until the desired chain tension is attained, while detent pawl 92 ratchets on said detent ratchet 58. When desired chain tension has been achieved, rotation or application of chain winding gear 14 is terminated, and the detent pawl 92 engaged on clamped detent ratchet 58 prevents the chain from unwinding, since said pawl permits only counter-clockwise rotation of said detent ratchet 58.

In a particular reference to FIG. 8 showing said log 46 orientation in the ASR Design II hand brake, at every such rotation of the chain winding gear 14, said log portion 46 disposed within said movable cam 44 allows the pinion 50 to rotate in the clockwise direction by an angular displacement 47 which is between 14 and 19 degrees, thereby causing partial chain unwinding. This partial unwinding must be overcome by the next repetitive rotation of the chain winding gear 14 requiring additional torque to be generated by said cylinder 31.

In a particular reference to FIG. 9, said log 46 orientation is shown as applicable for the ASR Design III hand brake. It can be seen that said log 46 is preloaded against the pinion 50 in the counter-clockwise direction due to said operating ratchet 350 rotating as a single unit with said drive shaft 24 and said detent ratchet 58, thereby preventing partial unwindings of the chain winding gear 14. The gain in efficiency due to said operating gear 350 substantially disposed about the drive shaft 24 allowed to reduce the internal diameter of the single acting cylinder 320 to 2.5" as compared with the internal diameter of 3.25" in the ASR Design II hand brake, thereby using less pressure to achieve required chain vertical load of 3,350 lbs.

In reference to FIG. 10, there are shown a control means, generally designated 200, disposed within ASR Design II apparatus.

Said control means 200 comprise a first reciprocating valve means 220 and a second reciprocating valve means 230 cooperating with each other to supply a source of air pressure 50 to the operating cylinder 31. At least one control valve means 240 is also provided to redirect path of the fluid pressure to the rod end of the cylinder 31 and aid a return spring 34 in completely returning the piston 32 to its fully returned position. Furthermore, at least one control valve means 250 is provided for stopping an automatic application of the hand brake in case of the emergency of reversal of the unintended operation. Finally, valve means 290 are provided to quickly exhaust fluid pressure from the operating cylinder 31 to atmosphere.

The start of the process to wind up the chain (not shown) is achieved by activating pushbutton 202 attached to application valve member 200. It allows a source of fluid pressure 50 from an emergency reservoir (not shown) to flow through said valve 200 and into pilot 212 attached to activation valve 210. The build-up of the pressure in the pilot 212 to a predetermined value causes valve 210 to open and allow fluid pressure 50 to flow through said valve 210 to first reciprocating valves 220 and second reciprocating valve 230. When drive arm 152 engages pushbutton 232 attached to said valve 230, it allows fluid pressure 50 to flow through valve 230 into pilot 224 attached to first reciprocating valve 220. The predetermined pressure in the pilot 224 will cause the valve 220 to shift and allow fluid pressure 50 to flow through said valve 220 in four directions. The primary directions of the fluid pressure will be to the backside of the piston 32, causing the piston 32 to now drive the rod 33 down pushing the air back out of the cylinder to atmosphere 284 through quick exhaust valve 290 and, more importantly, rotating lever 152 in a clock-wise direction, causing the hand brake 20 to wind up. Additionally, when the load on the chain is fully applied, the fluid pressure will flow to the pilot 214 attached to the activation valve 210 causing the valve 210 to shift into the vented position and cut-off fluid pressure supply 50 from the emergency reservoir. Furthermore, the fluid pressure will flow through the quick exhaust valve 280 to the pilot 242 attached to the change-over valve 242, causing said valve 240 to shift and allow fluid pressure supply 50 to flow to front side of the piston 32 further aiding its return to the original position. Yet additionally, the fluid pressure will be exhausted to atmosphere 284 through choke 282 which is of regulating type to apply predetermined fluid pressure to the pilot 242.

Once the piston 32 reaches the bottom of its stroke, the drive arm 152 will activate pushbutton 222 attached to the first reciprocating valve 220, closing said valve 220. Furthermore, the return spring 34 is going to drive the piston 32 to its original position pushing the air back out of the cylinder to atmosphere 284 through quick exhaust valve 290. Significantly near the end of the returned stroke, the fluid pressure from the valve 240 enters the cylinder and cooperates with the return spring 34 to return the piston 32 to its original position, and more importantly, disengages the automatic apply mechanism holding pawl 158 (not shown). Furthermore, the drive arm 152 engages pushbutton 232, opening valve 230, which is going to cause air to go back in the cylinder again through first reciprocating valve 220. The apparatus 10 continues this cycling motion until it gets the hand brake 20 completely wound up to achieve vertical chain load of 3,350 lbs. Upon achieving said load, the pressure in the line between valve 220 and valve 290 will increase causing valve 210 to shift and went to atmosphere 24, but more importantly, closing the supply of the fluid pressure 50. At the same time, the predetermined pressure in the pilot 242 will cause valve 240 to shift allowing fluid pressure to flow to the bottom side of the cylinder 31.

The final element of the ASR Design II hand brake control means 200 includes a shut-off valve 250 to reverse braking action or misintented brake application. Said valve 250 is connected in-line between first reciprocating valve 220 and operating cylinder 31. The valve 250 is activated by a pushbutton 252 and has a spring return means 254. Said valve 250 upon activation of pushbutton 252 will close the flow of fluid pressure to the operating cylinder 30 during automatic application causing the line between said valve 250 and operating cylinder 31 to be exhausted to atmosphere through said valve 250. At the same time, the fluid pressure in the line 258 between first reciprocating valve 220 and emergency shut-off valve 250 will increase to a predetermined pressure greater than the pressure 216 inside the pilot 214 and pressure 246 inside the pilot 242 causing first reciprocating valve 220 to shift and closing off the fluid pressure supply 50 to the application circuit.

Figure 11:
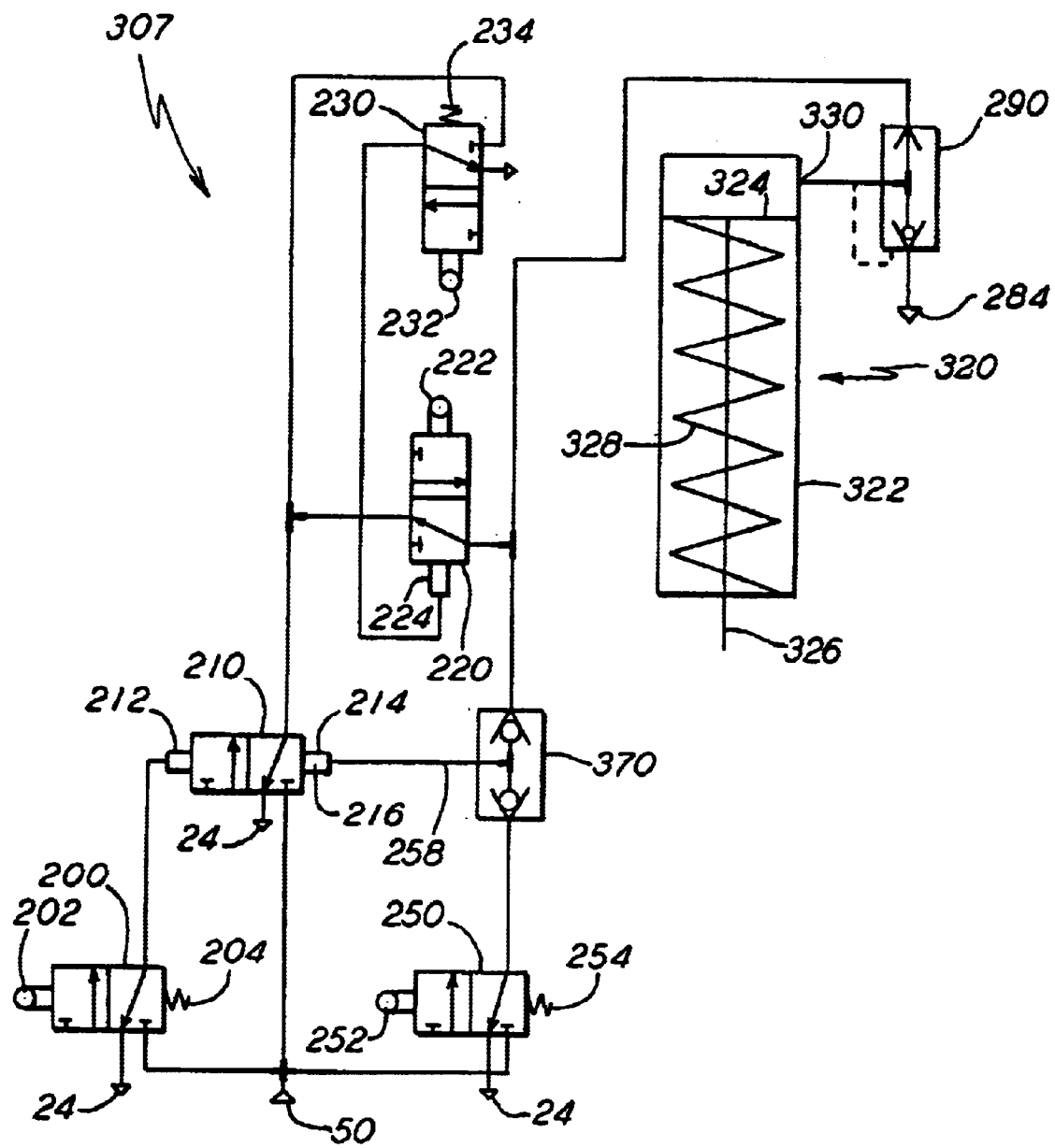
FIG. 11 is a schematic illustration of the ASR Design III control circuit.

The ASR Design III hand brake improves upon the control means of the ASR Design II hand brake in that it eliminates the control valve 240, exhaust valve 280 and one exhaust valve 290 used for redirecting the fluid pressure flow to the rod side of the cylinder 31. As shown in FIG. 11, the control means, generally designated 307, are simplified due to application of the single acting cylinder 320 as the result of the overall improved efficiency of the ASR apparatus 300. A shuttle valve 370 is provided to close the supply of fluid pressure to the cylinder 320 upon actuation of the pushbutton 252. The resulting increase of the fluid pressure in the line 258 between said first reciprocating valve 220 and emergency shut-off valve 250 will increase to a predetermined pressure greater than the pressure 216 inside the pilot 214 causing first reciprocating valve 220 to shift and close off the fluid pressure supply 50 to the application circuit. Additionally, valve means 200, 210, 220, 230 and 250 can be operated by the variety of power means such as manual, mechanical, electrical, electronic or pneumatic.

Preliminary testing to verify performance output of the ASR Design III hand brake was conducted using three different methods.

In the first method, the ASR Design III hand brake configuration was tested on an AAR certified Power Rack at 10,13, and 18 inches of chain travel. At each chain travel increment, the ASR Hand Brake was tested with a 3,500 in$^3$ air supply at 70, 65, and 60 psi. Three tests were conducted at each starting pressure, yielding nine total test points at each chain travel increment. Air supply pressure, vertical chain load, and cylinder pressure was recorded with respect to time during each test.

In the second method, ASR Design III hand brake configuration was tested using a TMX® Brake Assembly mounted on a 100-ton truck of the railway vehicle at 13 and 18 inches of chain travel. At each chain travel increment, the ASR Hand Brake was tested with a 3,500 in$^3$ air supply at 70, 65, and 60 psi. Three tests were conducted at each starting pressure, yielding nine total test points at each chain travel increment. Air supply pressure, vertical chain load, and cylinder pressure were recorded with respect to time during each test.

In the third method, the ASR Design III hand brake configuration was tested against a body mounted brake assembly mounted on a GATX tank car at 13 and 18 inches of chain travel. At each chain travel increment, the ASR Hand Brake was tested with a 3,500 in$^3$ air supply at 70, 65, and 60 psi. Three tests were conducted at each starting pressure, yielding nine total test points at each chain travel increment. Before each test the brake rigging was pulled back to its maximum position so that the brake beams and shoes where pulled away from the wheels and causing more drag on the brake system than should be encountered in the field. Air supply pressure, vertical chain load, and cylinder pressure were recorded with respect to time during each test.

Table 1, as follows, is a summary of the test results of all three conditions at 70 psi, 65 psi, and 60 psi of pressure with a nominal chain take-up of 13" and a maximum, or worst case, chain take-up of 18".

As it can be seen in table 1, in particularly reference to rows 14, 15, and 16, the ASR Design III hand brake was able to achieve the required load of 3,350 lbs in all conditions at 70 psi typical initial reservoir pressure. It can be further seen that the ASR Design III hand brake achieved the required load for all condition at 65 psi, except for testing with Body Mounted Brake at 18" maximum chain take-up, as shown in column 4, row 16. Of a particular importance is the testing performed at 60 psi. At this pressure the ASR Design III hand brake achieved required load of 3,350 lb in a Power Rack testing method for both chain take-up of 13" and 18", as well as for TMX® Brake at 13" of chain take-up. The ASR Design III hand brake further achieved 96% of the required load of 3,350 lb in a TMX® Brake testing method for 18" of chain take-up indicating advantageous performance and further indicating the need for field testing to fully verify performance output at 60 psi typical initial reservoir pressure. Successful field testing, achieving the required load of 3,350 lbs, will enable to approach AAR Brake Systems Committee for consideration to allow the typical initial emergency reservoir pressure to be set at 60 psi for hand brake application in combination with a TMX® Brake system thereby reducing the time needed to recharge said emergency reservoir and brake pipe pressure.

Further testing utilizing a TMX® mounted brake unit was performed to quantify improvements of the ASR Design III hand brake as compared with the ASR Design II hand brake. The testing results were obtained for 18" of chain take up and 70 psi starting pressure. Table 2, as follows, contains the testing results for ASR Design II hand brake and Table 3, as follow, contains the testing results for ASR Design III hand brake.

In a particular reference to column 7, row 7 in Table 2 and Column 6, Row 7 in Table 3, it has been determined that the Average Hold Vertical Chain Load achieved with ASR Design III hand brake exceeded the Average Hold Vertical Chain Load achieved with ASR Design II hand brake by 45%. In further reference to column 7, row 5 in Table 2 and Column 6, Row 5 in Table 3, it can be seen that the advantageous increase of the Average Hold Vertical Chain Load was accomplished with only 3.4% increase of the Average Peak Vertical Chain Load.

It must be noted, in reference to row 6 in Table 2, that the cylinder and reservoir pressures equalized during the test of the ASR Design II hand brake, therefore the brake did not transfer chain load from the ASR apparatus to the Hand Brake unit. Based upon successful previous tests conducted at 90 psi, a typical load loss during load transfer was approximately 1,000 lbs. Therefore the Horizontal Chain Holding Load was estimated to be the Peak Horizontal Chain Load reduced by 1,000 lbs.

It must be further noted, in reference to rows 5 and 7 in both Tables 2 and 3 that the Vertical Chain Load was calculated based on the Measured Horizontal Chain Load since AAR specifies that said Horizontal Chain Load must be at 90% of said Vertical Chain Load.

In additional reference to column 7, row 3 in Table 2 and Column 6, Row 3 in Table 3, it can be seen that the advantageous increase of the Average Hold Vertical Chain Load was accomplished with a 36% decrease in pressure loss of ASR Design III hand brake, resulting in a more efficient operation.

TABLE 1

ASR Design III R&D Test Summary of 13" and 18" Chain Take-Up

| | Columns | | | | | | |
|---|---|---|---|---|---|---|---|
| | 1 | 2 | 3 | 4 | 5 | 6 | |
| | \multicolumn{6}{c}{Typical Initial Reservoir Pressure} | |
| | 70 psi | | 65 psi | | 60 psi | | |
| Chain Take-Up (in) | 13 | 18 | 13 | 18 | 13 | 18 | Row |
| Power Rack $P_o$ | 70.57 | 70.93 | 65.31 | 65.78 | 62.49 | 62.66 | 1 |
| $P_f$ | 54.57 | 49.13 | 49.56 | 44.27 | 45.98 | 40.85 | 2 |
| TMX ® Brake $P_o$ | 70.49 | 70.52 | 65.10 | 65.52 | 60.63 | 60.61 | 3 |
| $P_f$ | 48.84 | 43.68 | 42.17 | 39.44 | 39.33 | 34.53 | 4 |
| Body Mounted Brake $P_o$ | 69.88 | 69.74 | 65.34 | 65.09 | 60.06 | 59.97 | 5 |
| $P_f$ | 47.10 | 43.63 | 43.33 | 34.22 | 38.11 | 33.08 | 6 |
| | | | | | | | 7 |
| Avg* Air Usage ($\Delta$psi = $P_o - P_f$) | | | | | | | 8 |
| Power Rack | 16.00 | 21.80 | 15.75 | 21.50 | 16.51 | 21.81 | 9 |
| TMX ® Brake | 21.33 | 26.84 | 22.92 | 26.07 | 21.30 | 26.08 | 10 |
| Body Mounted Brake | 22.10 | 26.39 | 22.00 | 30.88 | 21.95 | 26.89 | 11 |
| | | | | | | | 12 |
| Avg* Vert. Peak Load (lb) | | | | | | | 13 |
| Power Rack | 5,086.00 | 5,588.05 | 4,721.56 | 5,129.77 | 4,536.71 | 4,730.22 | 14 |
| TMX ® Brake | 3,782.36 | 3,727.78 | 3,947.10 | 3,418.15 | 3,593.01 | 3,229.63 | 15 |
| Body Mounted Brake | 3,497.88 | 3,412.19 | 3,370.79 | 3,051.15 | 3,002.05 | 2,677.59 | 16 |
| | | | | | | | 17 |
| Avg* Time to Peak Load (sec) | | | | | | | 18 |
| Power Rack | 53.34 | 66.81 | 48.27 | 68.71 | 50.93 | 73.62 | 19 |
| TMX ® Brake | 61.44 | 81.69 | 75.98 | 87.28 | 77.84 | 89.67 | 20 |
| Body Mounted Brake | 67.96 | 83.68 | 79.02 | 94.52 | 117.46 | 109.67 | 21 |

TABLE 2

ASR Design II TMX ® Results at 70 psi and 18" chain Take-Up

| | Column | | | | | | | |
|---|---|---|---|---|---|---|---|---|
| | 1 | 2 | 3 | 4 | 5 | 6 | 7 | |
| | Test 2 | Test 3 | Test 5 | Test 8 | Test 10 | Test 11 | Avg | Row |
| Start Pressure (psi) | 71.53 | 72.73 | 70.15 | 70.10 | 69.92 | 72.16 | 71.10 | 1 |
| Ending Pressure (psi) | 32.76 | 33.48 | 31.38 | 31.40 | 30.90 | 31.33 | 31.87 | 2 |
| Pressure Difference | 38.76 | 39.25 | 38.76 | 38.70 | 39.02 | 40.83 | 39.22 | 3 |
| Measured Peak Horiz Chain Load (lbs) | 3,134.34 | 3,220.88 | 3,386.63 | 3,390.00 | 2,902.60 | 2,975.94 | 3,168.40 | 4 |
| Peak Vert Chain Load (lbs) | 3,482.60 | 3,578.76 | 3,762.92 | 3,766.67 | 3,225.11 | 3,306.60 | 3,520.44 | 5 |
| Estimated Hold Horiz Chain Load (lbs) | 2,134.34 | 2,220.88 | 2,386.63 | 2,390.00 | 1,902.60 | 1,975.94 | 2,168.40 | 6 |
| Hold Vert Chain Load (lbs) | 2,371.49 | 2,467.64 | 2,651.81 | 2,655.56 | 2,114.00 | 2,195.49 | 2,409.33 | 7 |
| Vert Load Loss | 1,111.11 | 1,111.11 | 1,111.11 | 1,111.11 | 1,111.11 | 1,111.11 | 1,111.11 | 8 |
| Time to Peak Load (sec) | 136.40 | 132.00 | 139.80 | 139.80 | 140.80 | 140.60 | 138.23 | 9 |
| Time to Peak Load (min) | 2.27 | 2.20 | 2.33 | 2.33 | 2.35 | 2.34 | 2.30 | 10 |

TABLE 3

ASR Design III TMX ® Results at 70 psi and 18" chain Take-Up

| | Column | | | | | | |
|---|---|---|---|---|---|---|---|
| | 1<br>Test 1 | 2<br>Test 2 | 3<br>Test 4 | 4<br>Test 5 | 5<br>Test 6 | 6<br>Avg | Row |
| Start Pressure (psi) | 70.91 | 70.13 | 69.00 | 70.07 | 69.21 | 69.86 | 1 |
| Ending Pressure (psi) | 45.15 | 42.21 | 46.39 | 44.51 | 46.13 | 44.88 | 2 |
| Pressure Difference | 25.76 | 27.92 | 22.61 | 25.56 | 23.08 | 24.99 | 3 |
| Measured Peak Horiz Chain Load (lbs) | 3,371.00 | 3,339.00 | 3,283.84 | 3,289.61 | 3,098.99 | 3,276.49 | 4 |
| Peak Vert Chain Load (lbs) | 3,745.56 | 3,710.00 | 3,648.71 | 3,655.12 | 3,443.32 | 3,640.54 | 5 |
| Measured Hold Horiz Chain Load (lbs) | 3,224.09 | 3,229.86 | 3,110.54 | 3,223.18 | 2,992.12 | 3,155.96 | 6 |
| Hold Vert Chain Load (lbs) | 3,582.32 | 3,588.73 | 3,456.16 | 3,581.31 | 3,324.58 | 3,506.62 | 7 |
| Vert Load Loss | 163.23 | 121.27 | 192.56 | 73.81 | 118.74 | 133.92 | 8 |
| Time to Peak Load (sec) | 78.80 | 84.57 | 83.00 | 79.6 | 88.90 | 82.97 | 9 |
| Time to Peak Load (min) | 1.31 | 1.41 | 1.38 | 1.33 | 1.48 | 1.38 | 10 |

While the presently preferred embodiment and various additional alternative embodiments for carrying out the instant invention have been set forth in detail in accordance with the Patent Act, those persons skilled in the hand brake art to which this invention pertains will recognize various alternative ways of practicing the invention without departing from the spirit and scope of the appended claims.

I claim:

1. In a hand brake having an automatic set and release apparatus engageable with a hand brake assembly for automatically applying at least one brake means secured to a railway vehicle with such hand brake assembly, said hand brake assembly having a chain winding gear, a drive shaft disposed within a housing of said hand brake assembly, a hand wheel mounted to one end of said drive shaft, a clutch mechanism having a pinion, said pinion disposed at a distal end of said drive shaft, said pinion engaging said chain winding gear during a chain winding process, a detent ratchet engaging said drive shaft, a detent pawl disposed within said housing, said detent pawl engaging said detent ratchet to prevent the unwinding of said chain winding gear, an operating ratchet engageable with such hand brake assembly for operating such hand brake assembly which will cause an application of such at least one brake means, a mounting bracket attached to said housing, an application cylinder mounted on said mounting bracket, a drive arm having a first pivot and a second pivot, said drive arm connected to said application cylinder at said second pivot, said drive arm capable of reciprocating with respect to said application cylinder upon the application of a force thereto to supply a predetermined pressure to said operating ratchet at least an amount which is sufficient to cause such application of said at least one brake means; an operating pawl pivotally attached to said drive arm for engaging a tooth within said operating ratchet upon the application of said force to said drive arm and to cause rotation of said ratchet; a spring means secured to said drive arm for urging said operating pawl into contact with said tooth within said operating ratchet, a control means connected to a source of a fluid pressure, said controls means for initiating and regulating the supply of said fluid pressure to said application cylinder, said controls means for stopping an automatic application of such at least one brake means in case of the emergency or a reversal of the unintended activation; the improvement comprising:

said operating ratchet substantially engageble with said drive shaft, said operating ratchet mounted externally to said hand brake housing; said operating ratchet rotating as a single unit with said drive shaft and said detent ratchet, said operating ratchet thereby preventing partial unwindings of said chain winding gear;

said drive arm pivotally collared about said drive shaft, said drive arm mounted externally to said hand brake housing adjacent said operating ratchet; and wherein said application cylinder is a single acting cylinder.

2. The combination, as recited in claim 1, wherein said operating ratchet is mounted internally of said housing.

3. The combination, as recited in claim 2, wherein said operating ratchet is engaging said detent pawl during the chain winding process, said operating ratchet replacing said detent ratchet.

4. The combination, as recited in claim 1, wherein said application cylinder is pivotally mounted on said mounting bracket at a cylinder pivot thereof.

5. The combination, as recited in claim 1, wherein said application cylinder has a diameter of approximately 2.5".

6. The combination, as recited in claim 1, further including a friction reducing means disposed adjacent said operating ratchet and said drive arm are provided to substantially reduce friction upon rotation of said drive arm.

7. The combination, as recited in claim 6, wherein said friction reducing means includes:
   (a) a first spacer having a flange mounted between said operating ratchet and said drive arm, said first spacer substantially reducing friction during rotation of said drive arm, said flange disposed between said drive arm and said drive shaft for substantially reducing the friction between said drive arm and said drive shaft during the rotation thereof; and
   (b) a second brass spacer mounted between said drive arm and said housing, said second spacer substantially reducing friction during rotation of said drive arm.

8. The combination, as recited in claim 7, wherein said first and second spacers are brass.

9. The combination, as recited in claim 7, wherein said first and second spacers are plastic material having friction reducing properties.

10. The combination, as recited in claim 1, wherein at least one well known wave spring is mounted between said operating ratchet and said hand wheel for preventing movement of said operating ratchet and said drive arm along the axis of said drive shaft.

* * * * *